US011836087B2

(12) United States Patent
Yudanov

(10) Patent No.: US 11,836,087 B2
(45) Date of Patent: Dec. 5, 2023

(54) PER-PROCESS RE-CONFIGURABLE CACHES

(71) Applicant: Micron Technology, Inc., Boise, ID (US)

(72) Inventor: Dmitri Yudanov, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/132,537

(22) Filed: Dec. 23, 2020

(65) Prior Publication Data
US 2022/0197814 A1 Jun. 23, 2022

(51) Int. Cl.
*G06F 12/08* (2016.01)
*G06F 12/0893* (2016.01)

(52) U.S. Cl.
CPC .... *G06F 12/0893* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 5,117,350 A | 5/1992 | Parrish et al. | |
| 6,138,179 A | 10/2000 | Chrabaszcz et al. | |
| 8,001,266 B1 | 8/2011 | Gonzalez et al. | |
| 8,042,109 B2 | 10/2011 | Johnson et al. | |
| 8,402,061 B1 | 3/2013 | Briggs et al. | |
| 8,943,501 B1 | 1/2015 | Havemose | |
| 9,250,891 B1 | 2/2016 | Beranek et al. | |
| 10,606,670 B2 | 3/2020 | Zhao et al. | |
| 11,366,752 B2 | 6/2022 | Yudanov | |
| 11,436,041 B2 | 9/2022 | Yudanov et al. | |
| 2004/0230687 A1 | 11/2004 | Nakamura et al. | |
| 2005/0060174 A1 | 3/2005 | Heyward et al. | |
| 2005/0116958 A1 | 6/2005 | Walls et al. | |
| 2006/0064421 A1 | 3/2006 | Futagawa | |
| 2006/0085679 A1 | 4/2006 | Neary et al. | |
| 2007/0130441 A1 | 6/2007 | Wooten | |

(Continued)

FOREIGN PATENT DOCUMENTS

CN 103631612 3/2014
EP 3425499 7/2019
(Continued)

OTHER PUBLICATIONS

International Search Report and Written Opinion, PCT/US2020/053529, dated Jan. 20, 2021.
(Continued)

*Primary Examiner* — Tracy C Chan
(74) *Attorney, Agent, or Firm* — Greenberg Traurig

(57) ABSTRACT

The disclosed embodiments relate to per-process configuration caches in storage devices. A method is disclosed comprising initiating a new process, the new process associated with a process context; configuring a region in a memory device, the region associated with the process context, wherein the configuring comprises setting one or more cache parameters that modify operation of the memory device; and mapping the process context to the region of the memory device.

17 Claims, 9 Drawing Sheets

(56) References Cited

U.S. PATENT DOCUMENTS

| | | |
|---|---|---|
| 2007/0186044 A1* | 8/2007 | Fowles .............. G06F 12/0806 |
| | | 711/130 |
| 2007/0214342 A1* | 9/2007 | Newburn ........... G06F 11/3612 |
| | | 712/216 |
| 2007/0226702 A1 | 9/2007 | Segger |
| 2008/0010431 A1 | 1/2008 | Chang et al. |
| 2009/0265715 A1 | 10/2009 | Erlingsson et al. |
| 2009/0307693 A1 | 12/2009 | Do et al. |
| 2011/0125974 A1 | 5/2011 | Anderson |
| 2012/0041914 A1* | 2/2012 | Tirunagari ........... G06F 12/121 |
| | | 706/15 |
| 2012/0054753 A1 | 3/2012 | Nagasaka et al. |
| 2012/0221785 A1* | 8/2012 | Chung ............... G06F 12/0893 |
| | | 711/E12.078 |
| 2013/0198459 A1 | 8/2013 | Joshi et al. |
| 2014/0122329 A1 | 5/2014 | Naggar et al. |
| 2014/0215155 A1 | 7/2014 | Miller et al. |
| 2014/0317634 A1 | 10/2014 | Ishikawa et al. |
| 2014/0372356 A1 | 12/2014 | Bilal et al. |
| 2015/0046902 A1 | 2/2015 | Kumar et al. |
| 2015/0081978 A1* | 3/2015 | Daly ....................... G06F 12/12 |
| | | 711/133 |
| 2015/0178108 A1 | 6/2015 | Tarasuk-levin et al. |
| 2015/0309942 A1* | 10/2015 | Moretti .................. G06F 16/00 |
| | | 711/128 |
| 2016/0239236 A1 | 8/2016 | Huang et al. |
| 2016/0378583 A1 | 12/2016 | Nakano et al. |
| 2017/0017576 A1* | 1/2017 | Cammarota ........ G06F 12/0893 |
| 2017/0123997 A1 | 5/2017 | Aslot et al. |
| 2017/0180340 A1 | 6/2017 | Smith et al. |
| 2017/0185301 A1* | 6/2017 | McGiverin ........... G06F 3/0604 |
| 2017/0262465 A1 | 9/2017 | Goggin et al. |
| 2017/0357600 A1 | 12/2017 | Moon |
| 2018/0210777 A1 | 7/2018 | Carpentier et al. |
| 2018/0239624 A1 | 8/2018 | Tsirkin |
| 2018/0293087 A1 | 10/2018 | Lee et al. |
| 2018/0302327 A1 | 10/2018 | Anantharam et al. |
| 2019/0042453 A1 | 2/2019 | Basak et al. |
| 2019/0138919 A1 | 5/2019 | Chen |
| 2019/0156207 A1 | 5/2019 | Chen |
| 2019/0317843 A1* | 10/2019 | Zhao .................... G06F 11/3037 |
| 2020/0081658 A1* | 3/2020 | Choi ........................ G06F 3/064 |
| 2020/0117455 A1 | 4/2020 | Ray et al. |
| 2020/0233279 A1 | 7/2020 | Kikuchi et al. |
| 2020/0272566 A1 | 8/2020 | Saeki |
| 2021/0064495 A1 | 3/2021 | Huang et al. |
| 2021/0103462 A1* | 4/2021 | Yudanov ................ G06F 11/302 |
| 2021/0103463 A1 | 4/2021 | Yudanov et al. |
| 2021/0294746 A1* | 9/2021 | Yudanov ............. G06F 12/0284 |
| 2022/0283936 A1 | 9/2022 | Yudanov |
| 2022/0308922 A1 | 9/2022 | Mutalik et al. |

FOREIGN PATENT DOCUMENTS

| | | |
|---|---|---|
| JP | 2005275707 | 10/2005 |
| JP | 2008097425 | 4/2008 |
| WO | 2019171237 | 9/2019 |

OTHER PUBLICATIONS

International Search Report and Written Opinion, PCT/US2020/053532, dated Jan. 22, 2021.

Bergan, et al. "Deterministic Process Groups in dOS." The ACM Digital Library, Association for Computing Machinery, 2021.

Xiong, et al. "Memory Access Scheduling Based on Dynamic Multilevel Priority in Shared DRAM Systems." ACM Transactions on Architecture and Code Optimization, vol. 13, No. 4, Article 42, Dec. 2016.

International Search Report and Written Opinion, PCT/US2021/063834, dated Apr. 14, 2022.

Address Mapping between Shared Memory Modules and Cache Sets, U.S. Appl. No. 16/824,621, filed Mar. 19, 2020, 8511, Jun. 1, 2022, Dmitri Yudanov, Patented Case.

Address Mapping between Shared Memory Modules and Cache Sets, U.S. Appl. No. 17/752,142, filed May 24, 2022, 9397, Jun. 1, 2022, Dmitri Yudanov, Docketed New Case—Ready for Examination.

Customized Root Processes for Individual Applications, U.S. Appl. No. 16/592,529, filed Oct. 3, 2019, 3794, Nov. 12, 2022, Dmitri Yudanov, et al., Notice of Allowance Mailed—Application Received in Office of Publications.

Customized Root Processes for Groups of Applications, U.S. Appl. No. 16/592,537, filed Oct. 3, 2019, 5267, Dmitri Yudanov, et al., Patented Case.

Customized Root Processes for Groups of Applications, U.S. Appl. No. 17/898,642, filed Aug. 30, 2022, 6842, Dmitri Yudanov, et al., Docketed New Case—Ready for Examination.

Pramono, Subuh, et al., "Performance of Groundplane Shaping in Four-Element Dualband MIMO Antenna." Telkomnika, Mar. 2017.

Bergan, Tom, et al., "Deterministic Process Groups in dOS." OSDI 10, Oct. 4, 2015.

Xiong, Dongliang, et al., "Memory Access Scheduling Based on Dynamic Multilevel Priority in Shared DRAM Systems." TACO, Dec. 2, 2016.

Extended European Search Report, EP20871293.5, dated Sep. 7, 2023.

Supllementary European Search Report, EP20872379.1, dated Sep. 12, 2023.

Wikipedia, "Copy-on-write." Retrieved from the Internet <https://en.wikipedia.org/w/index.php?title=Copy-onwrite&oldid=916116133> on Aug. 14, 2023.

* cited by examiner

PER-PROCESS RE-CONFIGURABLE CACHES

FIELD OF THE TECHNOLOGY

At least some embodiments disclosed herein relate to processes for computing systems in general, and more particularly, to customized root processes for individual applications in a computing device.

BACKGROUND

In many computing systems, child processes are spawned from parent processes. Many such systems organize processes in a tree, having a single root process from which all child processes spawn. During spawning, a child process copies the state of the parent process and proceeds to modify or extend this state during operation. For example, a child process may copy shared objects (e.g., library code) and replace application code with an image of the child application code.

In the Android® operating system (OS), this single root process is referred to as a "zygote" process or a zero process. Android is a mobile OS created using a modified version of the Linux® kernel and other open-source software and is designed primarily for mobile devices (e.g., smartphones, tablets, etc.). More recently, Android has also been used for Internet of Things (IoT) devices and other non-traditional computing devices such as televisions, household appliances, in-vehicle information systems, wearable smart devices, game consoles, digital cameras. Some versions of Android have also been designed for traditional computing devices such as desktop and laptop computing devices. Android, Linux, and other similarly designed OSs are referred to as "UNIX-like" OSs.

The creation of a non-zero process by Android, Linux, or other similar Unix-like OSs, occurs when another process executes the system call represented by "fork( )," which causes forking of a process into multiple processes. The process that invoked the forking is the parent process, and a newly created process is a child process. In UNIX-like OSs, the kernel can identify each process by its process identifier, e.g., "0" for the initial or zero processes. In UNIX-like OSs, the zero process (i.e., process 0) is a root process generated when the OS boots. A first child process (e.g., process 1), known as "init," can at least be partially derived from the zero process and can become the ancestor of every other process in the OS.

BRIEF DESCRIPTION OF THE DRAWINGS

The present disclosure will be understood more fully from the detailed description given below and from the accompanying drawings of various embodiments of the disclosure.

DETAILED DESCRIPTION

The disclosed embodiments describe techniques for providing per-process re-configurable caches to processes executing on a computing device.

In many computing devices, significant sharing occurs among applications because they are composed of various root processes, all of which may have the same originating process. Thus, when forking these processes, instead of copying context, some systems extend the process by reserving a share in a global context. Upon modification, each forked application process can fill this share. Since the context is global, a processor or other controller does not need to context-switch amongst many applications, which makes it incur context-switch overhead, as well as inter-process communication overhead. Instead, it simply jumps from share to share, continuously running shared bytecode of applications. In this sense, the OS and applications are merged together, representing a global shared context. When the shared context is placed in memory (especially non-volatile memory), it continuously evolves and persists there according to the user using the device. Hence, it is suitable for processing in memory such that each share could be executed by a local in-memory core or controller.

Additionally, it is common that modern systems on a chip (SoCs) have a deep cache hierarchy, including L1, L2, and L3 caches. However, their capacity is not sufficient. Some current systems stack multiple static random-access memory (SRAM) dies to increase cache capacity. SRAM is expensive, however, and thus not feasible for many devices. The disclosed embodiments utilize dynamic random-access memory (DRAM) in a product form of a hybrid memory cube (HMC), high bandwidth memory (HBM), or embedded DRAM (eDRAM), or another custom stackable interface or dual in-line memory module (DIMM) interface. However, the disclosed techniques can be applied to other than DRAM memory types including SRAM, holographic RAM (HRAM), magnetic tunnel junction (MTJ) and others. The disclosed embodiments allocate regions in memory configured with certain capacities, cache policies, associativity, a certain number of banks, certain size of cache lines and page sizes, certain allotment and QoS guarantee of a memory bus bandwidth, etc. These allocations are made on a per-process basis with consideration of aggregate resource utilization. In this manner, each such region of memory can be considered as a distinct virtual cache. In some embodiments, the virtual caches are backed by dedicated cache-like memory regions of a memory device implementing such region with aforementioned capabilities in hardware or in silicon. The following description provides further detail regarding the disclosed embodiments.

Figure 1A:
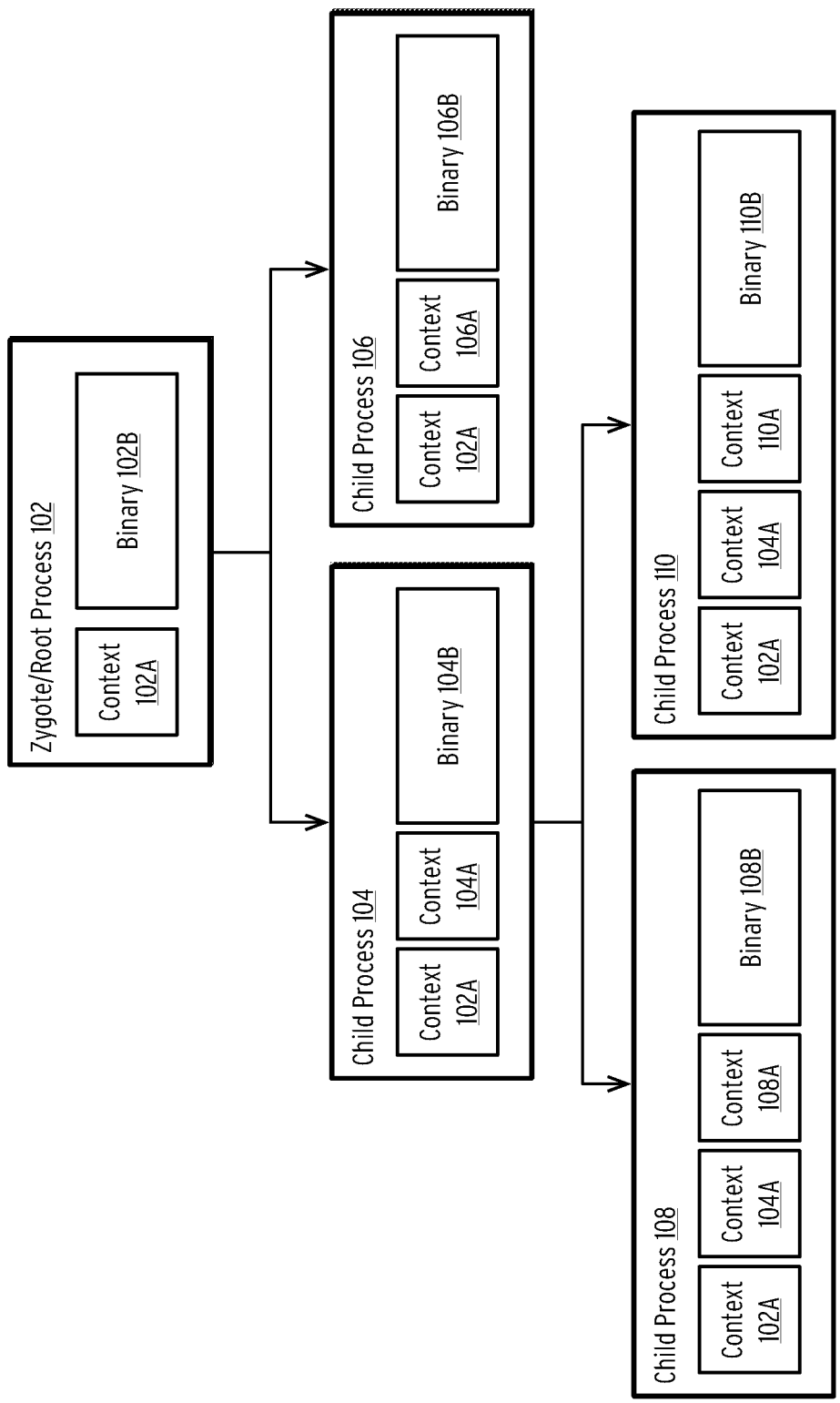
FIG. 1A is a diagram illustrating a hierarchical process tree according to some embodiments of the disclosure.

FIG. 1A is a diagram illustrating a hierarchical process tree according to some embodiments of the disclosure.

In the illustrated embodiment, a process tree includes a root or zygote process 102. As illustrated, a zygote process 102 includes a context 102A and a binary 102B. In the illustrated embodiment, the context 102A comprises a set of data structures in memory, such as dynamically linked libraries (DLLs), bytecode, and other in-memory data. In the illustrated embodiment, the binary 102B comprises a virtual machine (VM) or another container that includes executable code. In one embodiment, the binary 102B includes code capable of spawning child processes such as processes 102 and 104. In some embodiments contexts and binaries can be merged and represented by a context.

In the illustrated embodiment, each sub-process 104-110 includes its own context (e.g., 104A, 106A, 108A, 110A) as well as the shared contexts of the calling processes (e.g., 102A for processes 104, 106; 102A and 104A for process 108; and 102A and 104A for process 110). In this manner, contexts accumulate as processes are spawned. Further, each process 104-110 includes its own binary or application code 104B-110b. In some embodiments, only the process-specific context (104A-110A) is writable by a corresponding process binary 104B-110b. In these embodiments, the shared contexts are read-only.

In the illustrated embodiment, context 102A may include common framework code and shared resources (e.g., activity themes) used by forked processes. To start a new process (e.g., processes 104, 106), the operating system forks the zygote process 102 then loads and runs the processes binary 104B, 106B in the new process 104, 106. This approach allows most of the context 102A allocated for framework code and other resources to be shared across all processes, as illustrated in shared contexts 102A in each process 104-110.

In the illustrated embodiment, the various contexts 102A-110A are stored in memory, such as random-access memory (RAM). In some embodiments, the system pages these contexts out of memory and to a persistent storage device such as a Flash memory. In some embodiments, the system will utilize memory as a cache layer and periodically persist (i.e., write back) the contents of memory to persistent storage. Thus, in some embodiments, an entire process (including contexts) can be restored from persistent storage. Further, the operating system generally operates on memory pages, which comprise fixed-size chunks of memory (e.g., 4 KB of memory). Memory pages can be classified as cached or anonymous. A cached memory page refers to a memory page backed by a file on storage (for example, code or memory-mapped files). Cache memory pages are either private or shared. Private pages are owned exclusively by one process (such as pages in contexts 108A, 110A). Shared pages are used by multiple processes (such as pages in contexts 102A-106A). Finally, an anonymous page refers to a memory page not backed by persistent storage (such as a page allocated via a mmap call).

When each process 104-110 is launched, a region of memory is allocated to the process. This region of memory generally comprises a heap useable by the process binary 104B-110b during execution and includes the corresponding context 104A-110A. Generally, the heap is configured with various parameters, such as a maximum allowable size. In general, the maximum size is based on the total size of memory. In general, current systems generally do not provide lower-level control over memory parameters and allocation, relying on a homogenous block of memory. Thus, each process receives the same "type" of memory during allocation.

Figure 1B:
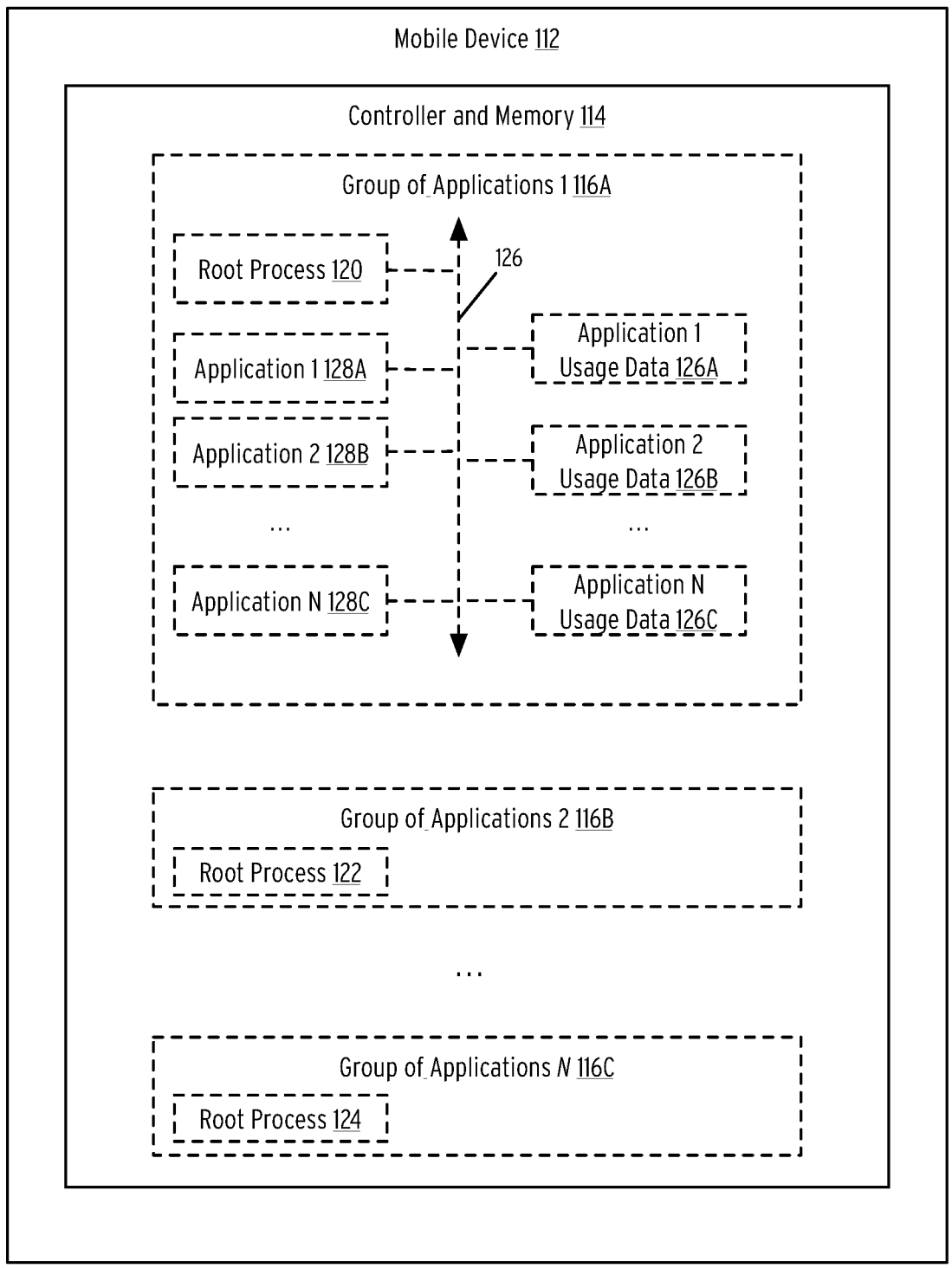
FIG. 1B illustrates an example mobile device including and running respective root processes for multiple groups of applications, in accordance with some embodiments of the present disclosure.

FIG. 1B illustrates an example mobile device including and running respective root processes for multiple groups of applications, in accordance with some embodiments of the present disclosure.

Specifically, FIG. 1B Illustrates mobile device 112 that at least includes a controller and memory 114. The controller and memory 114 of mobile device 112 can include instructions and data for applications executed in the mobile device (e.g., see applications 128A, 128B, and 128C of the group of applications 116a). The controller of the mobile device 112 can execute the instructions for the applications based on the data. The data can include application instruction code in binary format or in a format suitable for interpreting by programming language interpreter. The data can include some data structures, libraries, etc. The controller can also hold the instructions and data in the registers of the controller. The data can include application instruction code in binary format or in a format suitable for interpreting by programming language interpreter. The data can include some data structures, libraries, etc. The memory can hold the instructions and data in its memory cells. In some embodiments, the memory cells of the memory of the mobile device 112 can include flash memory cells and/or NVRAM cells. The NVRAM cells can be or include 3D XPoint memory cells.

In some embodiments, the memory can have different speeds, latencies, bandwidths, and other parameters. For example, SRAM memory can be used as a high-speed cache, DRAM as the main memory, and NVRAM as storage memory.

For a group of applications (e.g., see groups of applications 116a, 116b, and 116c), the instructions and data for applications in the group included and runnable in the mobile device 112 can include root process data and instructions for a root process of the group of applications. The respective root process of each group of applications included in the mobile device 112 (e.g., see root process 120 of the group of applications 116a, root process 122 of the group of applications 116b, and root process 124 of the group of applications 116c) can be implemented by the controller and the memory 114. The controller can be configured to execute the instructions of the root process of the group according to the instructions and data for the root process, and the memory can be configured to hold or store the instructions and the data for the execution of the root process by the controller.

The other processes of the group of applications included in the mobile device 112 (e.g., see applications 128A, 128B, and 128C, in which each application has other processes) can be implemented by the controller and the memory 114 too. The controller can be configured to execute the instructions of the other processes of the group of applications according to the instructions and data for the other processes, and the memory can be configured to hold or store the instructions and the data for the execution of the other processes by the controller.

In the mobile device 112, usage of a plurality of applications (e.g., see applications 128A, 128B, and 128C) can be monitored to determine memory access for each of the plurality of applications. Data related to the usage of the plurality of applications (e.g., see application usage data 126A, 126B, and 126C) can be stored in the mobile device, such as in the memory of the mobile device (e.g., see controller and memory 114). The plurality of applications can also be group into groups (e.g., see groups of applications 116a, 116b, and 116c) according to data related to the usage of the plurality of applications (e.g., see application usage data 126A, 126B, 126C). As shown, logical connections of a group of applications can logically associate or connect application usage data with corresponding applications belonging to the group as well as the root process of the group (e.g., see logical connections 126). The root process of a group of applications (e.g., see root processes 120, 122, and 124) can also be customized and executed according to usage data common to each application in the group (e.g., see application usage data 126A, 126B, and 126C which can include common data that links applications 128A, 128B, and 128C). The commonality between usage data of applications in a group can be determined via logical connections (e.g., see logical connections 126). In some embodiments, the logical connections may be implemented by a relational database stored and executed by the controller and memory 114. An entry in such a database can describe each connection. For instance, application 128A may be connected to application 128B because they share a common object (e.g., where they both read-write data related to capturing user voice during mobile phone calls). In some embodiments, more than one root process per group can exist. In other embodiments, one application can belong to multiple groups. For example, referring to FIG. 1B an application can belong to a group of applications 116a and a group of applications 116b (not shown).

Figure 2:
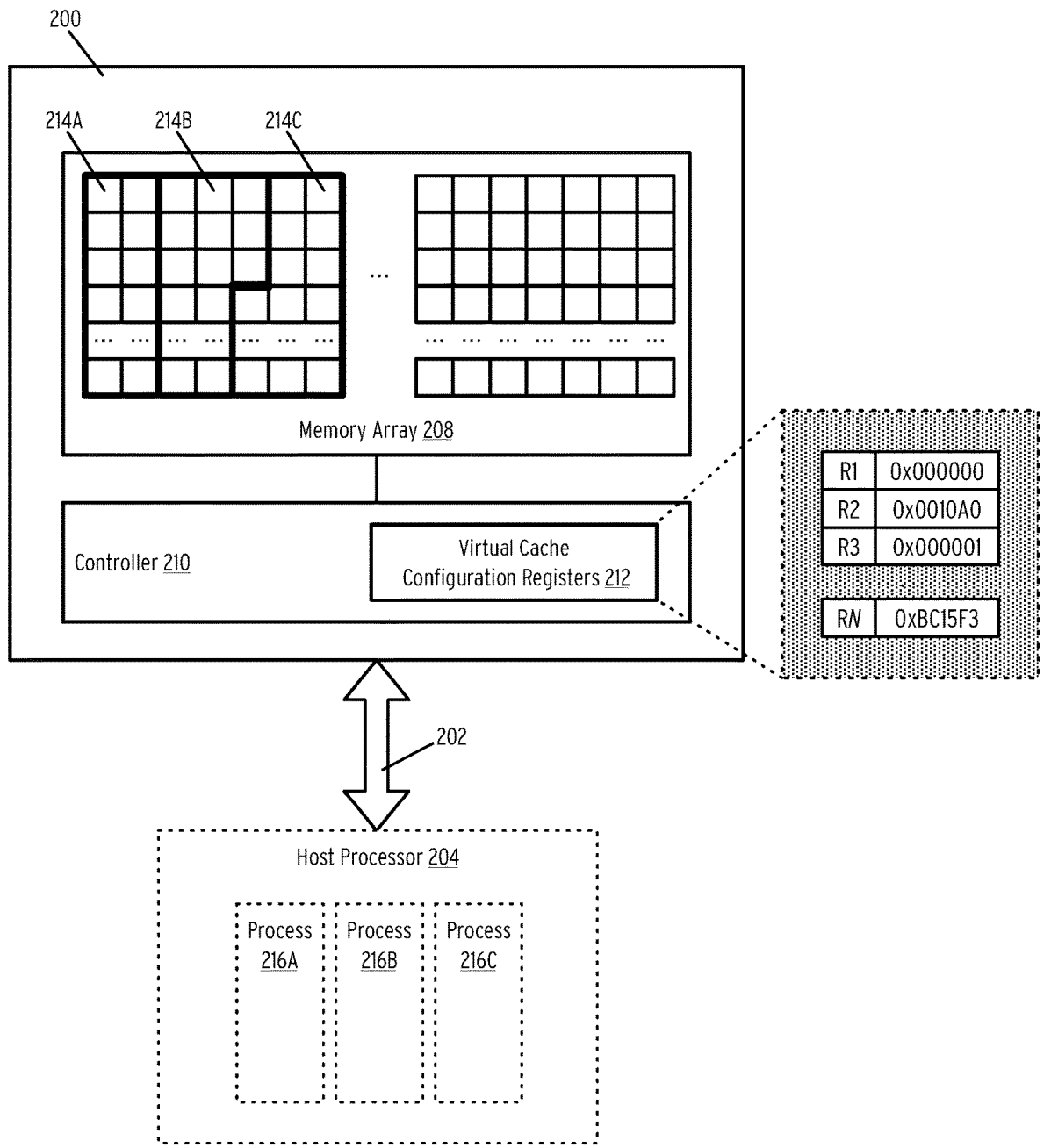
FIG. 2 is a diagram of a memory device according to some embodiments of the disclosure.

FIG. 2 is a diagram of a memory device according to some embodiments of the disclosure.

In the illustrated embodiment, a memory device 200 is communicatively coupled to a host processor 204 via a bus 202. In one embodiment, memory device 200 may comprise any volatile or non-volatile storage device. In the illustrated embodiment, memory device 200 includes a memory array 208 that includes a plurality of memory cells. Although illustrated as a two-dimensional, planar array, this is not limiting, and other geometries of memory cells may be used to implement the memory array 208, including stacked dies or multi-deck dies. In one embodiment, each cell in the memory array 208 is identical. That is, the memory array 208 comprises a homogeneous array of cells. In an alternative embodiment, the memory array 208 may comprise a heterogeneous array of differing types of memory cells. Examples of a memory array 208 that includes different region types are described briefly in connection with FIGS. 7 and 8 and more fully in commonly-owned application bearing the Ser. No. 16/824,618, the disclosure of which is incorporated herein by reference in its entirety. As illustrated in FIG. 2, the cells in memory array 208 may belong to one or more regions 214A, 214B, or 214C. These regions may be determined by the controller 210, as described in more detail herein.

In one embodiment, the memory device 200 comprises a Flash memory having Flash memory cells. Also, for example, memory device 200 can include DRAM, including DRAM cells. Also, for example, memory device 200 can also include non-volatile random-access memory (NVRAM), including NVRAM cells. The NVRAM cells can include 3D XPoint memory cells. Also, the DRAM cells can be typical DRAM cells of varying types of typical DRAM cells, such as cells having ferroelectric elements. Also, cells can include ferroelectric transistor random-access memory (FeTRAM) cells. The memory cells can also have at least one of a transistor, a diode, a ferroelectric capacitor, or a combination thereof, for example a DRAM-HRAM combination.

In the illustrated embodiment, the host processor 204 executes one or more processes 216A, 216B, or 216C. These processes 216A, 216B, or 216C may comprise hierarchal processes, as described in FIG. 1A. In the illustrated embodiment, each process 216A, 216B, or 216C is associated with a corresponding region 214A, 214B, or 214C in the memory array 208). In one embodiment, the host processor 204 initializes the size of the regions 214A, 214B, or 214C for each process 216A, 216B, and 216C when the process is forked from a zygote or parent process. In other embodiments, the controller 210 may determine the size of the regions 214A, 214B, or 214C. In some embodiments, the host processor 204 provides a desired region size to the controller 210, and the controller 210 allocates the underlying memory cells in the memory array 208. Although illustrated as contiguous regions of memory, the regions 214A, 214B, or 214C may alternatively be non-contiguous, striped or interleaved, or spread across various memory banks, die, decks, subarrays and other memory device units.

From the perspective of the host processor 204, a given process 216A, 216B, or 216C accesses the memory assigned within its associated region 214A, 214B, 214C, via standard system calls. However, host processor 204 manages the regions according to a set of policies. As described herein, these policies may be represented as a set of cache parameters. In the illustrated embodiment, these parameters are stored within cache configuration registers 212.

In one embodiment, virtual cache configuration registers 212 are stored in a fast memory region of controller 210 or accessible to controller 210. For example, virtual cache configuration registers 212 may be implemented as a SRAM chip connected to controller 210. In some embodiments, the virtual cache configuration registers 212 may alternatively be stored in a designated region of the memory array 208. In some embodiments, each region 214A, 214B, 214C is associated with a set of cache parameters, and thus virtual cache configuration registers 212. In one embodiment, the bus 202 may store these parameters within the memory array 208 itself and, specifically, in a corresponding region 214A, 214B, 214C. In this embodiment, the virtual cache configuration registers 212 may be used as a lightweight cache. Thus, when processing data stored in a given region 214A, 214B, 214C, the controller 210 may read out the cache parameters, write the parameters to virtual cache configuration registers 212, and access the region 214A, 214B, 214C, according to the parameters in the virtual cache configuration registers 212. In this embodiment, by storing cache parameters in the regions 214A, 214B, 214C, the memory device 200 can persist the cache parameters to non-volatile storage as part of a routine process (e.g., write-back procedure). Further, storing cache parameters in regions 214A, 214B, 214C avoids excess register requirements.

As an example, FIG. 2 lists a set of N configuration registers (R1 through RN) that may be associated with a given region in memory. In the illustrated embodiment, some registers may store binary flags (e.g., R1 and R3). In this example, a binary flag enables and disables a memory feature. Further, other registers (e.g., R2 and RN) store values (0x0010A0 and 0xBC15F3) that define properties of memory features as well as enablement of memory features. In one embodiment, each register is associated with a feature (e.g., R1 is associated with write back enablement, R2 is associated with a page size, RN is associated with cache associativity, etc.). In some examples, cache configuration registers may store micro-code that implements a cache controller algorithm or a state machine including a replacement or eviction policty, tracking cache line locality or use frequency, micro-code governing cache tagging which may include cahce tags themselves.

As discussed, controller 210 processes all accesses between host processor 204 and memory array 208. As such, during requests for access to memory array 208, controller 210 reads the cache parameters from the virtual cache configuration registers 212 and adjusts access operations based on the cache parameters, as will be discussed in more detail herein.

Figure 3:
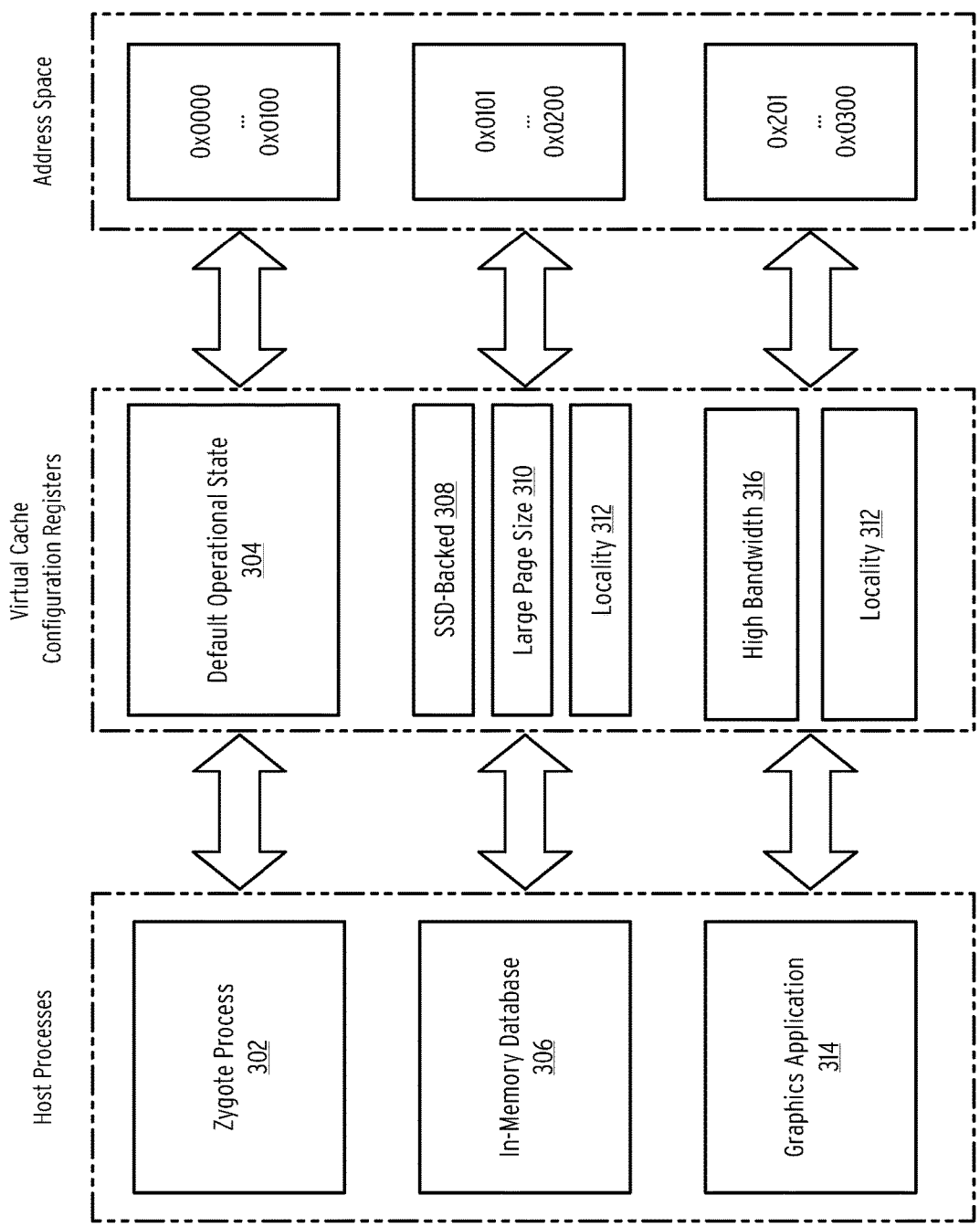
FIG. 3 is a diagram illustrating an exemplary mapping of processes to cache parameters according to some embodiments of the disclosure.

FIG. 3 is a diagram illustrating an exemplary mapping of processes to cache parameters according to some embodiments of the disclosure.

In the illustrated embodiment, a host processor executes three processes, including a zygote process 302, in-memory database process 306, and graphics application 314. Certainly, more or fewer processes may be executed in the actual operation of a computing device, and three processes are only provided for illustrative purposes.

In the illustrated embodiment, zygote process 302 comprises a root process, as discussed in FIG. 1A. In-memory database process 306 comprises a process that stores and provides access to a database completely in memory during execution. Graphics application 314 comprises a process that presents a graphical user interface (GUI) allowing users to open, manipulate, and save graphics data from a persistent data store and allows such manipulation to occur by accessing volatile memory.

In the illustrated embodiment, a zygote process 302 is associated with a first region in the address space of memory (0x0000 through 0x0100). In the illustrated embodiment, the zygote process 302 is associated with a default operational state 304. In one embodiment, the default operational state 304 may be represented by the absence of any cache parameters. In this embodiment, the memory operates normally. For example, a DRAM device may be accessed in a traditional manner.

By contrast, the zygote process 302 may, at a later time, fork an in-memory database process 306. As part of this forking, the memory mapping for the in-memory database process 306 may be configured with three cache parameters: an SSD-backed parameter 308, a large page size parameter 310, and a locality parameter 312. As illustrated, the in-memory database process 306 is then mapped to a second region in memory (0x0101 to 0x0200). In the illustrated embodiment, the various parameters 308, 310, 312, are stored as register values. In some embodiments, the register values may be stored in the memory array at, for example, the beginning of the region (e.g., at locations 0x0101, 0x0102, 0x0103). These locations may be read to a faster register file for quicker access by a memory controller. In various examples, a virtual cache can operate in a physical address space, virtual address space, or hybrid space (e.g., virtual tagging and physical addressing, or physical tagging and virtual addressing).

In the illustrated embodiment, the various parameters 308, 310, 312 modify how the in-memory database process 306 accesses the memory array or, alternatively, how the memory device handles the memory array and accesses thereto. For example, the SSD-backed parameter 308 may cause the memory controller to periodically write the contents of the region (0x0101 to 0x0200) or portion thereof to a non-volatile storage device such as a solid-state device. In some embodiments, this write-back is implemented as either a write-through cache or write-back cache to minimize accesses to the non-volatile storage device or a hybrid implementation where certain critical data units (pages or cache lines) are write-though written (in both cache and memory) and other data units are write-back written only on eviction. Thus, in some embodiments, the writing to non-volatile storage is only performed when necessary. As can be seen, in contrast to traditional memory operations, the controller can enable write-back/through cache functionality on a per-process basis or even per data unit (page or cache line) basis and thus simulate an in-memory write-back or write-through cache. For processes like databases, such an operation alleviates the complexity of having the process manage such caching and improves the overall performance of the system.

The in-memory database process 306 is also associated with a large page size parameter 310. In general, this flag increases the default page size by a fixed amount. In some embodiments, this parameter 310 modifies the kernel page size used by the in-memory database. For example, a mobile processor may utilize a 4 KiB page size as a default page size for a page table. However, some processors allow for varying page sizes (e.g., 64 KiB, 1 MiB, 16 MiB, etc.). Thus, in some embodiments, the parameter may define an alternative, larger page size to be used when set. By using a larger page size, the system can reduce the size of the page table including such techniques as transparent huge pages (THP) (subdividing a huge page into smaller pages but still taking advantage of large page size for translation lookaside buffer (TLB) efficiency).

The in-memory database process 306 is also associated with a locality parameter 312. In general, locality refers to ensuring that data that is frequently accessed together is within a short distance from one another in physical memory storage. Locality may be further defined based on the structure of data (i.e., fields of a structure are often accessed together) as well as the time of access (i.e., sequential records in a database are often accessed in sequence). In a default operational state 304, the memory controller may not consider locality when writing data and may, as a simple example, simply write data to memory sequentially to its address space. However, when locality parameter 312 is enabled, the memory controller may ensure that frequently accessed data is "grouped" in the address space to ensure locality. Locality can be associated with spatial data residency and data access proximity relative to address space (locality by address association) or with frequency of accessing data in time (locality by how frequent certain memory regions are being accessed) or combination of spatial and temporal vectors of locality.

In the illustrated embodiment, a third process, a graphics application 314, is associated with two cache parameters: a high bandwidth parameter 316 and a locality parameter 312. The locality parameter 312 has been discussed, and that discussion is not repeated. The high bandwidth parameter 316 may further adjust the operation of the memory device to enable high bandwidth access to memory for the graphics application 314. In one embodiment, a memory device may have multiple interfaces, and by setting high bandwidth parameter 316, the memory device may dedicate additional interfaces to the graphics application 314 during memory reads and writes. Alternatively, or in conjunction with the foregoing, the memory device may temporarily increase the clock frequency during memory reads or writes by graphics application 314. In some embodiments, the memory may disable error correction, allow for additional data transferred per line. In some embodiments, the memory may increase the number of lines (e.g., from two to four) accessible in a given read or write operation. Other techniques may exist for increasing the bandwidth of a memory device. Similar to a bandwidth metric, a latency metric can also be used alone or in conjunction with the bandwidth metric.

The foregoing cache parameters are examples and are not intended to be unduly limiting. Various other examples of cache parameters are additionally described herein.

Figure 4:
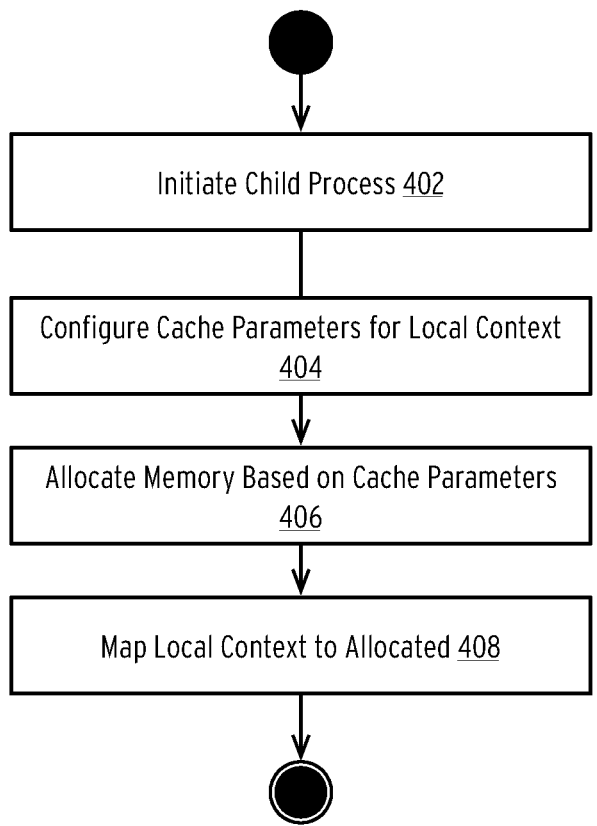
FIG. 4 is a flow diagram illustrating a method for initiating a new process according to some embodiments of the disclosure.

FIG. 4 is a flow diagram illustrating a method for initiating a new process according to some embodiments of the disclosure.

In block 402, the method initiates a child process.

In one embodiment, the child process is initiated by a root or zygote process, as discussed above. In one embodiment, the root or zygote process includes a shared context that is inherited by the child process. This shared context is referenced by the child process during initialization. Additionally, the child process may request its own local share of memory for processing specific to the child process. Thus, in some embodiments, the child process "extends" the context of the root or zygote process with its own local share. In some embodiments, a process other than a root or zygote process may initiate the child process, as discussed in FIG. 1A. In some embodiments, the method initiates a child process by forking a parent process.

In block 404, the method configures cache parameters for the local (or process) context of the child process.

In one embodiment, during the forking of a parent process, the child process may request memory to be associated with the local context. In these embodiments, during the initialize of the child process, the method may request one or more local shares to be configured to the resulting process and may receive corresponding descriptors of memory-mapped regions in return. In this embodiment, the cache parameters may be implemented via control groups (cgroups) or, more specifically, cpusets. In one embodiment, processes are configured using control groups (cgroups) or cpusets. A cgroup is a data structure that allocates resources (e.g., CPU time, memory, network bandwidth, etc.) among one or more processes. In general, cgroups are hierarchal, similar to process hierarchies. Thus, a child process can inherit cgroup properties from its parent processes along with context. In one embodiment, each possible configuration of memory (e.g., large page size, high associativity) is associated with a cgroup subsystem. In this manner, a forked process can select one or multiple subsystems to attach its custom cgroup policies to the new process. Cpusets refer to a specific subsystem of cgroups used to implement the re-configurable caches from the perspective of a process. The cpuset subsystem assigns individual CPUs and memory nodes to cgroups. Each cpuset can be specified according to the various parameters, including (1) the number of CPUs a process can access; (2) the memory nodes that processes are permitted to access, etc. Some operating systems may have different name for cgroups. Here we emphasize the meaning: cgroup is a way to control process parameters. In some examples both parent and child process may share a virtual cache. Such sharing would allow to achieve greater efficiency by unifying spatial and temporal locality of both processes. However, such embodiments would require implementing shared multi-process cache coherency, which can be micro-coded in virtual cache configuration registers. Delineation of child shared cache data from that of the parent can occur for example by COW (copy on write) rules.

Alternatively, or in conjunction with the foregoing, a child process may itself request memory regions from an operating system via an explicit initializing of a memory-mapped region. In this embodiment, the memory region is mapped after the child process is forked and after the child binary is executed. In this embodiment, the memory regions are created programmatically by the child process binary and are necessarily created after the binary launches. In some embodiments, these such regions may be dynamic allocations of heap memory during runtime of the child process.

In either embodiment, the method provides one or more cache parameters to the operating system to configure the memory. In general, memory regions are allocated without regard to underlying properties. Thus, in existing systems, a child process may simply request one or more memory-mapped regions of homogenous memory. By contrast, the method includes cache parameters in addition to a region size and name that allows for tuning of the regions. As described herein, these regions may generally be used as memory caches, however the disclosed embodiments are not limited to caching data and may be equally used for general memory operations as well as non-volatile operations.

In the illustrated embodiment, the operating system receives a set of cache parameters and an allocation request in either scenario. In response, a device driver of the operating system translates the request to commands issued to a memory device (depicted in FIG. 2) to allocate the region. In one embodiment, the operating system may transmit commands for each cache parameter. In response, the memory device sets the cache parameters to enable a memory controller to modify the operation of the memory region. Further detail on the operations of the memory device are provided in connection with FIG. 5.

In one embodiment, the one or more cache parameters comprise a parameter selected from the group consisting of a capacity, memory page size, cache policy, associativity, bank number, cache line size, allotment guarantee, and quality of service guarantee and other parementers as discussed previously.

In one embodiment, a capacity comprises the size of the memory region being allocated. In one embodiment, the memory page size represents the size of pages used by virtual memory (i.e., page table page sizes) used by the operating system.

In one embodiment, cache policy refers to one or more cache replacement or eviction strategies to implement in a given region. In this embodiment, the region operates as a cache that may be backed by a persistent, non-volatile storage device (e.g., SSD). In one embodiment, the memory device includes cache replacement logic for managing such a region. In one embodiment, the cache policy parameter defines one of many available cache replacement routines supported by a memory device. For example, a memory device may support first in first out (FIFO), last in first out (LIFO), first in last out (FILO), least recently used (LRU), time aware least recently used (TLRU), least frequently used (LFU), and various other cache replacement schemes. As such, the cache policy parameter may comprise a bit string identifying which policy should be used.

In one embodiment, the associativity parameter comprises a placement policy for a region of memory acting as a cache, as discussed above. As with the cache policy, the memory device may support multiple types of association when acting as a cache. The associativity parameter may specify whether the region should act as a direct-mapped cache, two-way set associative cache, two-way skewed associative cache, four-way set associative cache, eight-way set associative cache, n-way set associative cache, fully associative cache, or other type of associative cache. As can be seen, and as one example, cache policy and associativity parameters may be combined to define a caching scheme in memory.

In one embodiment, a bank number parameter or memory array or subarray parameter defines a requested memory slot (e.g., DIMM slot) for use by the child process. In one embodiment, a cache line size parameter refers to the width of rows stored in the cache and may comprise an integer value of bytes (e.g., 32, 64, or 128 bits).

In one embodiment, an allotment guarantee refers to ensuring that a necessary size of cache-acting memory is available to the child process. For example, the child process may request that at least 64 MB of cache-like memory is available for use. In these embodiments, the method may return a failure if the allotment guarantee is not possible (i.e., there is not enough available physical memory to provide the guarantee). The child process may be configured to trap such an error and request an alternative memory mapping.

In one embodiment, a quality of service (QoS) cache parameter may define one or many values that instruct the memory device to guarantee certain performance characteristics such as memory bandwidth or latency. For example, the QoS parameter may specify that any accesses to a region utilize all interfaces of a memory system to increase the amount of data read. Alternatively, the QoS parameter may specify that a clock rate of the memory device be increased to return data faster. In some embodiments, the QoS parameter may trigger additional error correction to ensure data is faithfully returned. In some embodiments, the QoS parameter may also trigger redundant storage of data to prevent corruption.

Alternatively, or in conjunction with the foregoing, the cache parameters may be automatically determined. In one embodiment, the method may identify a cache parameter by monitoring memory usage of previous instantiations of the child process and automatically determining optimal cache parameters based on memory accesses of the previous instantiations of the same child process. As discussed in FIG. 1B, each process may be associated with application usage data. This data may be analyzed to determine how a given process access memory and cache parameters may be determined therefrom. For example, if a given process frequently pages data out of memory, the method may determine that a larger region size may be needed.

In some embodiments, the operating system may implement a self-organizing map (SOM) to predict cache parameters. In this embodiment, the SOM may be trained using the application data to produce a low-dimensional (e.g., two-dimensional), discretized representation of the input space of the training samples. In some examples a SOM can be mapped to spatial or temporal aspects of accessing.

The foregoing parameters are exemplary only and other parameters not explicitly identified in the disclosure should be deemed to fall within the scope of the disclosure. Furthermore, while the foregoing description emphasizes the implementation in physical memory, some or all parameters may alternatively (or additionally) be implemented by the operating system as virtual memory parameters.

In block 406, the method allocates memory based on the cache parameters.

In this block, the operating system receives a confirmatory result from the memory device indicating that the region was successfully allocated according to the cache parameters. In response, the operating system may update its page table based on the memory allocations. Finally, the operating system may return a file descriptor of the allocated memory to the child process for subsequent use. Although memory mapping is used as an example, other techniques for allocating memory may be used and the use of file descriptor is exemplary only. In general, any pointer to a memory region may be returned as part of block 406.

In block 408, the method maps the local context to the allocated memory.

After establishing the region in memory, and configuring the parameters that control the memory controller, and assigning a virtual address space to the physical memory, the method then proceeds to map the local context to the allocated memory. In some embodiments, this comprises executing the child process binary and reading/writing data to the allocated memory. In some embodiments, this is performed on startup, as the child process initiates. In other embodiments, the process may be performed manually after manual allocation of memory or heap space. In general, during this step, the method accesses virtual and/or real memory in accordance with the cache parameters.

Although not illustrated, the child process may manually or automatically release regions of memory configured with cache parameters or pass these parameters to other processes via inter-process communication protocols. Such an operation may occur when the process terminates or may occur in response to a programmatic release of memory. In these scenarios, the operating system or memory device will remove any cache parameters from register storage, and release the allocated region back to a "pool" of available resources.

Figure 5:
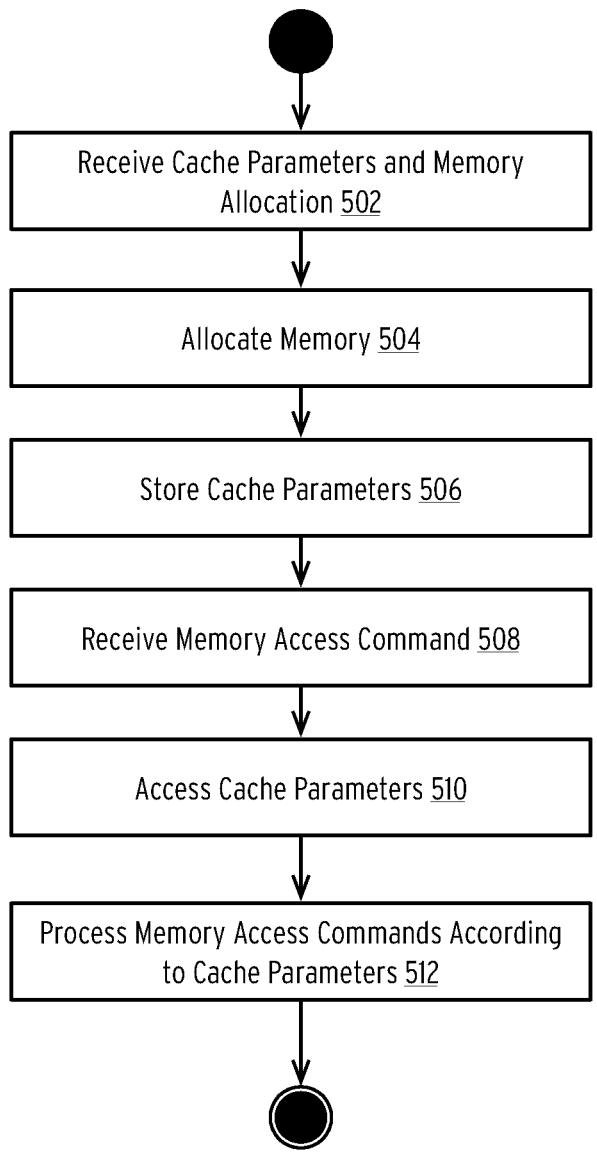
FIG. 5 is a flow diagram illustrating a method for configuring a cache according to some embodiments of the disclosure.

FIG. 5 is a flow diagram illustrating a method for configuring a cache according to some embodiments of the disclosure.

In block 502, the method receives cache parameters and a memory allocation.

As discussed above, an OS may issue commands to a memory device to reserve a region or share of memory for the local context of a process. The specific format of this command is not limiting. However, in the illustrated embodiment, the command includes one or more cache parameters (e.g., those discussed in FIG. 3). In one embodiment, the command also includes a size of memory requested.

In block 504, the method allocates a memory region.

In one embodiment, the method allocates a region of homogenous memory. In this embodiment, any standard method of allocating addresses of memory may be used. In other embodiments, the memory comprises a heterogeneous memory such as that depicted in FIGS. 7 and 8. In this embodiment, the method may programmatically determine how to allocate memory. For example, if the cache parameters indicate that caching is desired (e.g., a cache size, associativity type, etc. parameter is received), the method may allocate memory from an in-memory cache part (e.g., 702) of a memory device. In some embodiments, the method may alternatively allocate memory from a generic memory part (e.g., 704) if the cache parameters do not include cache-like parameters (or if no parameters are received). In some embodiments, the method may allocate from both types of memory in response to a request. For example, the command received in 502 may only request a portion of cache memory with a remainder of non-cache memory. In this example, the method may allocate memory from in-memory cache (e.g., 702) and allocate the rest of the requested region from regular part (e.g., 704).

In block 506, the method stores cache parameters.

In one embodiment, the method stores cache parameters in a dedicated register file. In this embodiment, the memory writes the cache parameters values to pre-determined registers and associates these registers with a given region. In other embodiments, the method may write the cache parameters to the storage medium (e.g., 702, 704). In these embodiments, the method may maintain a smaller register file and may read the cache parameters from the memory into the register file only when accessing the requested memory region.

In block 508, the method receives a memory access command (MAC) which can be read, write, or read-modify-write or any other command that accesses data.

As used herein, a MAC refers to any command that accesses a memory device. For example, a MAC may comprise a read or write command issued by an OS to the memory device in response to the operation of a process. In one embodiment, MACs are received over one or more memory interfaces (e.g., PCIe interfaces). In general, each MAC includes a memory address while some commands include additional fields such as data to write and configuration flags.

In block 510, the method retrieves the cache parameters.

In response to receiving a MAC, the method identifies the region the MAC is accessing. Since the MAC always includes an address, the memory device uses the address to locate the region. In one embodiment, the memory maintains a region table that maps memory regions to address range(s). The method queries this table using the address to retrieve the region identifier.

In one embodiment, the method will further identify cache parameters located in a register file that are associated with a region associated with the MAC. In other embodiments, the method may load the cache parameters from the memory region prior to processing the MAC. For example, after identifying a region identifier, the method may read a first segment of addresses from the region to load all cache parameters. These cache parameters are then stored in a fast register file for ease of access during MAC processing. Since MACs affecting the same region are often clustered, the register file allows for faster processing of MACs.

In block 512, the method processes the MAC based on the cache parameters.

After loading the cache parameters into a register file (or otherwise accessing such cache parameters), the method processes the MAC command based on the cache parameters. The method may keep cache parameters stored in register file so to reduce latency associated with accessing cache parameters on the subsequent MACs. Various details of memory operations modified by cache parameters have been described above and are not repeated herein. As one example, the cache parameters may specify that a memory region should be used as an LRU cache and be SSD-backed. Additionally, in this example, the memory region may be full (i.e., all addresses contain data) and the MAC may comprise a write command. As part of the LRU policy, the memory device may supplement each address with an "age" bit that enables the memory to find the oldest entry in the memory region. To process the MAC command, the memory reads this oldest entry and transmits the entry to an SSD device or non-volatile (NV) memory device for persistence. The method then writes the data in the MAC command to the region and sets the age bit to zero (or equivalent), indicating it is the newest data value.

Finally, it should be noted that for the embodiments described in FIGS. 4 and 5, cache memory may be shared among homogenous array of memory cells. Alternatively, in some embodiments, all references to memory in these figures may be referring to a dedicated in-memory cache portion of a memory device, described more fully in FIGS. 7 and 8.

Figure 6:
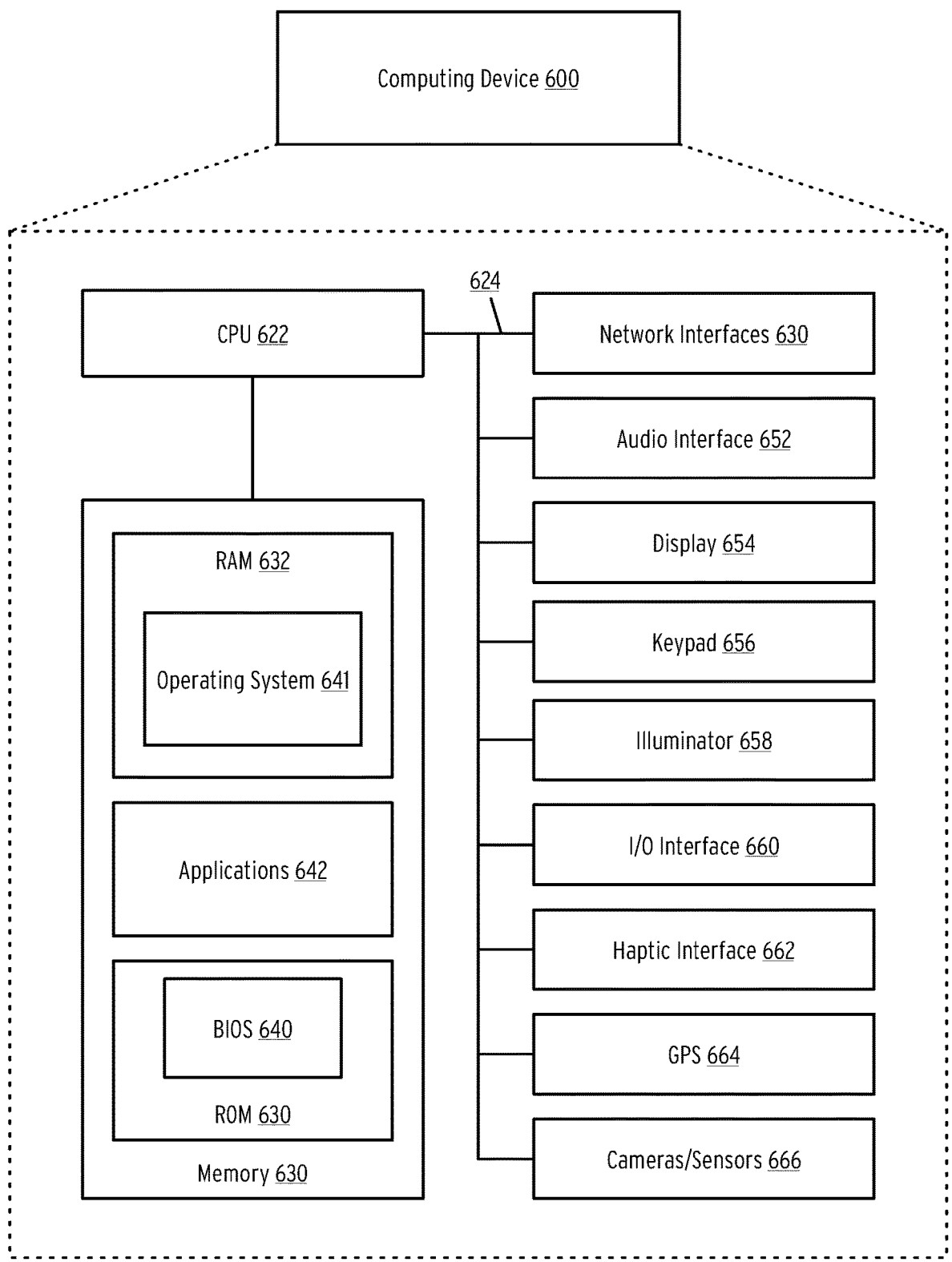
FIG. 6 is a block diagram illustrating a computing device showing an example embodiment of a computing device used in the various embodiments of the disclosure.

FIG. 6 is a block diagram illustrating a computing device showing an example embodiment of a computing device used in the various embodiments of the disclosure. The computing device 600 may include more or fewer components than those shown in FIG. 6. For example, a server computing device may not include audio interfaces, displays, keypads, illuminators, haptic interfaces, GPS receivers, cameras, or sensors.

As shown in the figure, the device 600 includes a processing unit (CPU) 622 in communication with a mass memory 630 via a bus 624. Other computing devices may be used in lieu of CPU 622 (e.g., GPU, neural processing unit or engine (NPU), reconfiguralbel computing device such as FPGA, etc). The computing device 600 also includes one or more network interfaces 650, an audio interface 652, a display 654, a keypad 656, an illuminator 658, an input/output interface 660, a haptic interface 662, an optional global positioning systems (GPS) receiver 664 and a camera (s) or other optical, thermal, or electromagnetic sensors 666. Device 600 can include one camera/sensor 666, or a plurality of cameras/sensors 666, as understood by those of skill in the art. The positioning of the camera(s)/sensor(s) 666 on the device 600 can change per device 600 model, per device 600 capabilities, and the like, or some combination thereof.

The computing device 600 may optionally communicate with a base station (not shown), or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad 656 may comprise any input device arranged to receive input from a user. Illuminator 658 may provide a status indication or provide light.

The computing device 600 also comprises input/output interface 660 for communicating with external devices, using communication technologies, such as USB, infrared, Bluetooth®, or the like. The haptic interface 662 provides tactile feedback to a user of the client device.

Optional GPS receiver 664 can determine the physical coordinates of the computing device 600 on the surface of the Earth, which typically outputs a location as latitude and longitude values. GPS receiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may through other components, provide other information that may be employed to determine a physical location of the device, including, for example, a MAC address, Internet Protocol (IP) address, or the like.

Mass memory 630 includes a RAM 632, a ROM 634, and other storage means. Mass memory 630 illustrates another example of computer storage media for storage of information such as computer-readable instructions, data structures, program modules, or other data. Mass memory 630 stores a basic input/output system ("BIOS") 640 for controlling the low-level operation of the computing device 600. The mass memory also stores an operating system 641 for controlling the operation of the computing device 600

Applications 642 may include computer-executable instructions which, when executed by the computing device 600, perform any of the methods (or portions of the methods) described previously in the description of the preceding Figures. In some embodiments, the software or programs implementing the method embodiments can be read from hard disk drive (not illustrated) and temporarily stored in RAM 632 by CPU 622. CPU 622 may then read the software or data from RAM 632, process them, and store them to RAM 632 again. In one embodiment, the mass memory 630 comprises a non-transitory computer-readable storage medium and the applications 642 comprise computer program instructions, or program logic, capable of being executed by a CPU 22 or other suitable computer processor.

Figure 7:
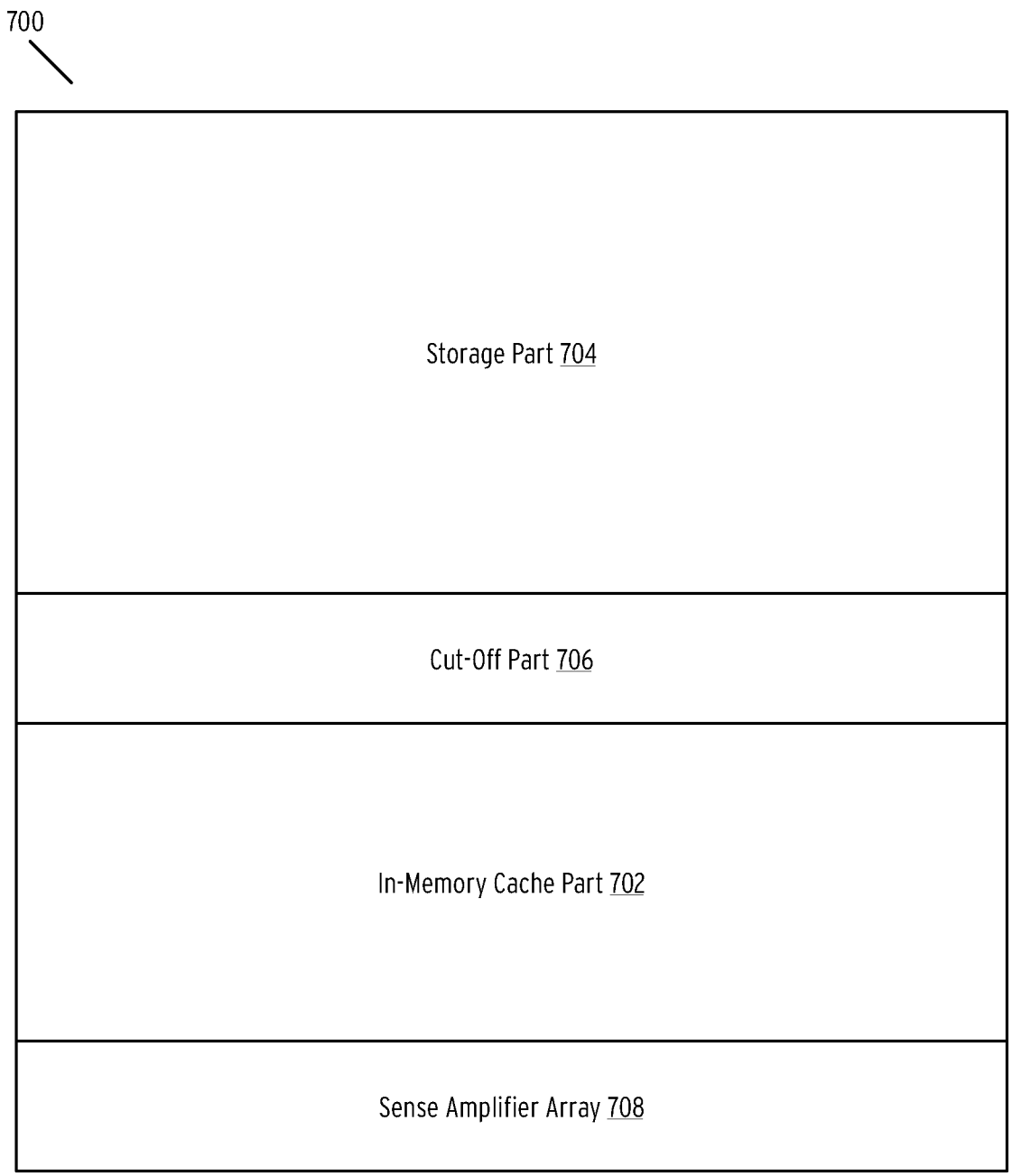
FIG. 7 illustrates example memory hardware with an in-memory cache part and an associated data storage part or a backing store part, in accordance with some embodiments of the present disclosure.

FIG. 7 illustrates example memory hardware with an in-memory cache part and an associated data storage part or a backing store part, in accordance with some embodiments of the present disclosure.

FIG. 7 illustrates example memory hardware 700 with an in-memory cache part 702 and an associated data storage part 704 (or in other words a backing store part), in accordance with some embodiments of the present disclosure. The in-memory cache part 702 and the storage part 704 are separated by a cut-off part 706 which can be made up of at least a special type of word line. Also shown in FIG. 7 is a sense amplifier array 708 configured to increase the speed of data access from at least the storage part 704 of the memory hardware 700. And, the sense amplifier array 708 can also be configured to increase the speed of data access from the in-memory cache part 702 of the memory hardware 700. Each section can include memory cells with a certain RC that is comparable with RC path to the sense amplifier. Thus, a section that is more proximate to SA may have smaller RC and therefore faster to access. Also, the sense amplifier array 708 can include or be a part of a chained array.

As mentioned, one of the problems to overcome in a memory apparatus having a regular storage part and an in-memory cache part (such as to implement PIM) is that the resistance-capacitance (RC) of each of the shallow caps or each of another type of data storage parts of the array of memory cells has to match or be a near match of the RC of corresponding bit lines or data lines (DLs). And, as mentioned, such a problem can be overcome by shortening the bit lines or DLs with a "cut-off" word line separating the sub-array of regular storage cells and the sub-array of in-memory cache cells (e.g., see cut-off part 706 shown in FIG. 7 as well as cut-off parts 706 and 806 shown in FIG. 8). In some embodiments, the shortening of the bit lines or DLs can occur when the in-memory cache is being accessed. In another embodiment in memory cache region can be fully residing in a separate memory array or subarray that is designed for low latency and high bandwidth data access.

Figure 8:
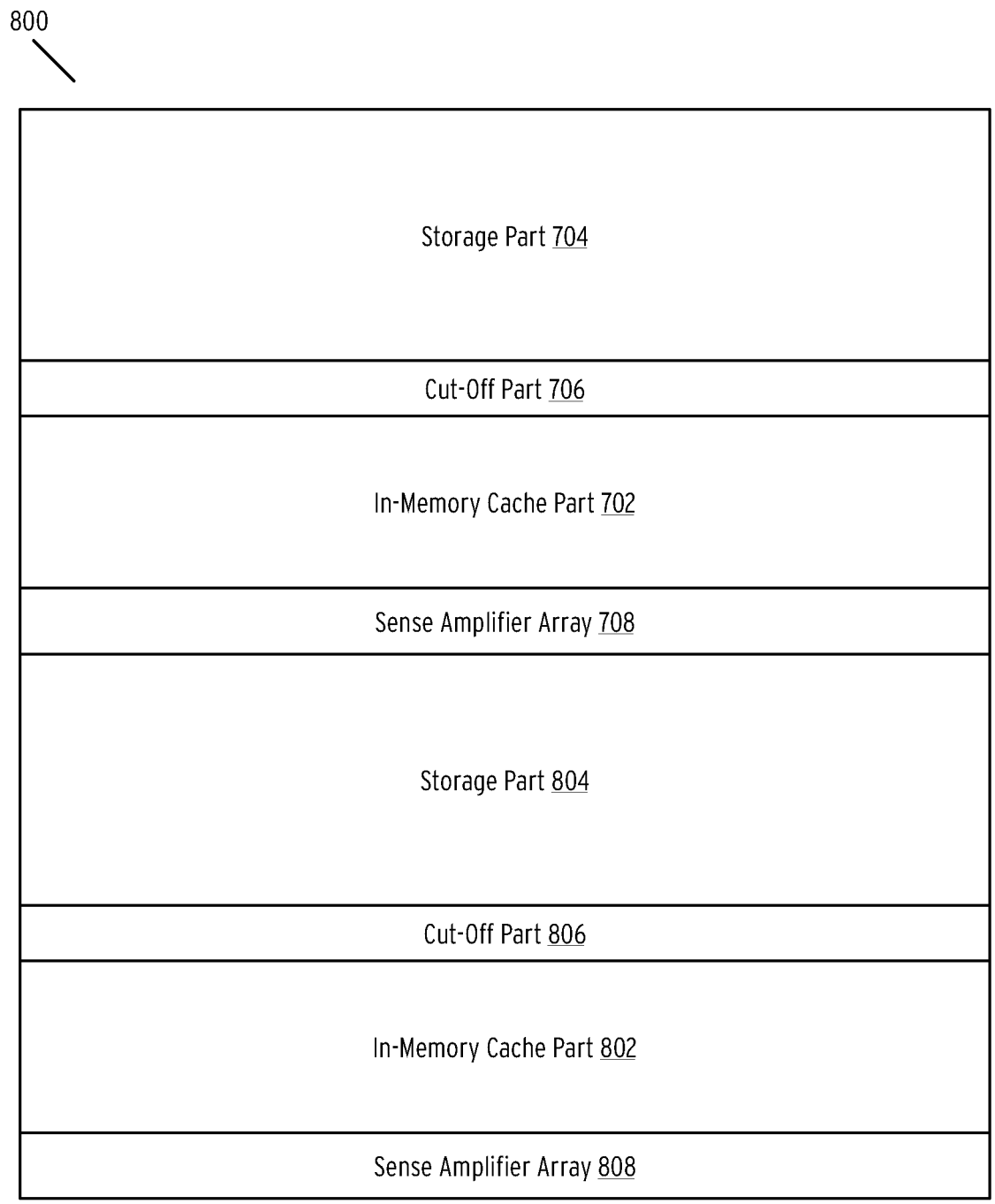
FIG. 8 illustrates example memory hardware with multiple in-memory cache parts and respective associated data storage parts or backing store parts, in accordance with some embodiments of the present disclosure.

FIG. 8 illustrates example memory hardware 800 with multiple in-memory cache parts (e.g., see in-memory cache parts 702 and 802) and respective associated data storage parts or backing store parts (e.g., see storage parts 704 and 804), in accordance with some embodiments of the present disclosure. Each in-memory cache part and respective storage part are separated by a respective cut-off part which can be made up of at least a special type of word line (e.g., see cut-off parts 706 and 806). Also shown in FIG. 8 are multiple sense amplifier arrays configured to increase the speed of data access from at least the storage parts of the memory hardware 800 (e.g., see sense amplifier arrays 708 and 808). And, the sense amplifier arrays of the memory hardware 800 can also be configured to increase the speed of data access from the cache parts of the memory hardware 800.

As mentioned, an example problem of the "cut-off" WL or more generally the cut-off parts of the memory hardware is that such a portion of the memory hardware can cause delays in accessing the storage cells of the hardware because it causes a pass transistor array in the storage cells. As mentioned, this may cause a slowing of access of data in the storage cells, but at the same time there is a relative high increase speed of data access in the in-memory cache cells. However, such a slowdown can be reduced by sharing the one or more sense amplifier arrays of the memory hardware with the pass transistor array of the hardware (e.g., see sense amplifier arrays 708 and 808). As shown in FIG. 8, some embodiments can leverage the sharing of a sense amplifier array by stacking or tiling each memory cell array. In such embodiments, as shown by FIG. 8, a first sense amplifier array (e.g., see sense amplifier array 708) can access multiple storage arrays—such as a storage cell array directly below the first sense amplifier array (e.g., see storage part 804) and one through an in-memory cache above the first sense amplifier array (e.g., see storage part 704). For example, 3D NAND Flash region can be below sense amp array and DRAM or SRAM in-memory cache can be above it.

In some embodiments, the memory hardware 700 is, includes, or is a part of an apparatus having a memory array (e.g., see the combination of the in-memory cache part 702, the storage part 704, the cut-off part 706, and the sense amplifier array 708). The apparatus can include a first section of the memory array which includes a first sub-array of memory cells (such as a first sub-array of bit cells). The first sub-array of memory cells can include a first type of memory. Also, the first sub-array of memory cells can constitute the storage part 704. The apparatus can also include a second section of the memory array. The second section can include a second sub-array of memory cells (such as a second sub-array of bit cells). The second sub-array of memory cells can include the first type of memory with a configuration to each memory cell of the second sub-array that is different from the configuration to each cell of the first sub-array. The configuration can include each memory cell of the second sub-array having less memory latency than each memory cell of the first sub-array to provide faster data access. Also, the second sub-array of memory cells can constitute the in-memory cache part 702. The memory cells described herein can include bit cells, multiple-bit cells, analog cells, and fuzzy logic cells for example. In some embodiments different types of cells can include different types of memory arrays and sections described herein can be on different decks or layers of a single die. In some embodiments different types of cells can include different types of memory arrays and sections described herein can be on different dies in a die stack. In some embodiment such cell array formations can have hierarchy of various memory types.

The second sub-array of memory cells can constitute the in-memory cache part 702 or another type or form of in-memory cache. The second sub-array may be short-lived data or temporary data or something else to show that this data is for intermediate use or for frequent use or for recent use.

The in-memory cache can be utilized for PIM. In such examples, the apparatus can include a processor in a processing-in-memory (PIM) chip, and the memory array is on the PIM chip as well. Other use cases can include an in-memory cache for simply most recently and/or frequently used data in a computing system that is separate from the apparatus, virtual-physical memory address translation page tables, scratchpad fast memory for various applications including graphics, AI, computer vision, etc., and hardware for database lookup tables and the like. In some embodiments, the in-memory cache may be used as the virtual caches described previously.

In some embodiments, wherein the apparatus includes a processor in a PIM chip and the memory array is on the PIM chip or not, the processor can be configured to store data in the first sub-array of memory cells (such as in the storage part 704). The processor can also be configured to cache data in the second sub-array of memory cells (such as in the in-memory cache part 702).

In some embodiments, the first sub-array of memory cells (e.g., see storage part 704) can include DRAM cells. In such embodiments and others, the second sub-array of memory cells (e.g., see in-memory cache part 702) can include differently configured DRAM memory cells. Each memory cell of the second sub-array can include at least one of a capacitance, or a resistance, or a combination thereof that is smaller than at least one of a capacitance, or a resistance, or a combination thereof of each memory cell of the first sub-array. In some embodiments, the first sub-array of memory cells can include DRAM cells, and the second sub-array of memory cells can include differently configured DRAM memory cells, and the differently configured DRAM memory cells of the second sub-array can include respective capacitors with less charge storage capacity than respective capacitors of the DRAM memory cells of the first sub-array. Also, it is to be understood that a smaller cap size does not necessarily mean the data access from it is faster. Instead, not only the capacitance C, but rather the RC of a whole circuit (e.g., memory cell connected to bit line and their combined RC) can be a priority factor in designing faster arrays for faster data access. For example, in the second sub-array, either one or both of: combined capacitance of a memory cell, access transistor, and bit line and combined resistance of a memory cell, access transistor, and bit line of the second sub-array can be smaller than that of the first sub-array. This can increase the speed of data access in the second sub-array over the first sub-array.

In some embodiments, each cell of the first sub-array of memory cells can include a storage component and an access component. And, each cell of the second sub-array of memory cells is the same type of memory cell as a memory cell in the first sub-array but differently configured in that it can include a differently configured storage component and/or access component. Each memory cell of the second sub-array can include at least one of a capacitance, or a resistance, or a combination thereof that is smaller than at least one of a capacitance, or a resistance, or a combination thereof of each memory cell of the first sub-array.

In some embodiments, a storage element function and access device element function can be combined in a single cell. Such memory cells can include phase-change memory (PCM) cells, resistive random-access memory (ReRAM) cells, 3D XPoint memory cells, and alike memory cells. For example, the first sub-array of memory cells can include 3D XPoint memory cells, and the second sub-array of memory cells can include differently configured 3D XPoint memory cells.

In some embodiments, the first sub-array of memory cells can include flash memory cells, and the second sub-array of memory cells can include differently configured flash memory cells. And, each memory cell of the second sub-array can include at least one of a capacitance, or a resistance, or a combination thereof that is smaller than at least one of a capacitance, or a resistance, or a combination thereof of each memory cell of the first sub-array.

In some embodiments, at least one of a capacitance, or a resistance, or a combination thereof of a memory cell, an access component (such as an access transistor, an access diode, or another type of memory access device), and a bit line of the second sub-array is smaller than at least one of a capacitance, or a resistance, or a combination thereof of a memory cell, an access component, and a bit line of the first sub-array.

In some embodiments, a special word line that separates the first sub-array of memory cells from the second sub-array of memory cells (e.g., see cut-off part 706). In such embodiments and others, the special word line creates a pass transistor array in the memory array. In some embodiments, the special word line that separates the first sub-array of bit cells from the second sub-array of bit cells can include drivers or active devices (such as pull-up or pull-down transistors, signal amplifiers, repeaters, re-translators, etc.). Inclusion of such drivers or active devices can make the word line (or WL) a signal amplifying word line.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

In this description, various functions and operations may be described as being performed by or caused by software code to simplify description. However, those skilled in the art will recognize what is meant by such expressions is that the functions result from execution of the code by one or more processors, such as a microprocessor, application specific integrated circuit (ASIC), graphics processor, and/or a field-programmable gate array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., an FPGA, an ASIC, etc.), a system on a chip (SoC), or another suitable processor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed:

1. A method comprising:
    initiating a new process, the new process associated with a process context associated with the new process in a memory device upon initiation and including data structures used by the new process during execution;
    determining one or more cache parameters based on memory accesses of the previous instantiations based on monitored memory accesses of previous instantiations of the new process, the one or more cache parameters comprising categorical parameters that control how the new process accesses an assigned region of the memory device, wherein the one or more cache parameters are shared among the new process and one or more other processes;

configuring a region in the memory device based on the one or more cache parameters, the region associated with the allocated process context; and mapping the process context to the region of the memory device.

2. The method of claim 1, wherein a parent process of the new process is associated with a global context and wherein the new process can access the global context after launching.

3. The method of claim 1, wherein the one or more cache parameters comprise a parameter selected from the group consisting of a capacity, memory page size, cache policy, associativity, bank number, cache line size, allotment guarantee, address space type, and quality of service (QoS) guarantee.

4. The method of claim 1, further comprising determining optimal cache parameters using a self-organizing map.

5. The method of claim 1, wherein configuring the region in the memory device comprises configuring memory usage via one or both of cpusets or cgroups.

6. The method of claim 1, wherein configuring the region in the memory device comprises setting one or more registers in the memory device.

7. A non-transitory computer-readable storage medium for tangibly storing computer program instructions capable of being executed by a computer processor, the computer program instructions defining the steps of:

initiating a new process, the new process associated with a process context associated with the new process in a memory device upon initiation and including data structures used by the new process during execution;

determining one or more cache parameters based on memory accesses of the previous instantiations based on monitored memory accesses of previous instantiations of the new process, the one or more cache parameters comprising categorical parameters that control how the new process accesses an assigned region of the memory device, wherein the one or more cache parameters are shared among the new process and one or more other processes;

configuring a region in the memory device based on the one or more cache parameters, the region associated with the allocated process context; and mapping the process context to the region of the memory device.

8. The non-transitory computer-readable storage medium of claim 7, wherein a parent process of the new process is associated with a global context and wherein the new process can access the global context after launching.

9. The non-transitory computer-readable storage medium of claim 7, wherein the one or more cache parameters comprise a parameter selected from the group consisting of a capacity, memory page size, cache policy, associativity, bank number, cache line size, allotment guarantee, address space type, and quality of service (QoS) guarantee.

10. The non-transitory computer-readable storage medium of claim 7, further comprising determining optimal cache parameters using a self-organizing map.

11. The non-transitory computer-readable storage medium of claim 7, wherein configuring the region in the memory device comprises configuring memory usage via one or both of cpusets or cgroups.

12. The non-transitory computer-readable storage medium of claim 11, wherein configuring the region in the memory device comprises setting one or more registers in the memory device.

13. A device comprising:
a memory device;
a processor; and
a storage medium for tangibly storing thereon program logic for execution by the processor, the program logic configured to perform the steps of:

initiating a new process, the new process associated with a process context associated with the new process in a memory device upon initiation and including data structures used by the new process during execution;

determining one or more cache parameters based on memory accesses of the previous instantiations based on monitored memory accesses of previous instantiations of the new process, the one or more cache parameters comprising categorical parameters that control how the new process accesses an assigned region of the memory device, wherein the one or more cache parameters are shared among the new process and one or more other processes;

configuring a region in the memory device based on the one or more cache parameters, the region associated with the allocated process context; and mapping the process context to the region of the memory device.

14. The device of claim 13, wherein a parent process of the new process is associated with a global context and wherein the new process can access the global context after launching.

15. The device of claim 13, wherein the one or more cache parameters comprise a parameter selected from the group consisting of a capacity, memory page size, cache policy, associativity, bank number, cache line size, allotment guarantee, address space type, and quality of service (QoS) guarantee.

16. The device of claim 13, wherein configuring the region in the memory device comprises configuring memory usage via one or both of cpusets or cgroups.

17. The device of claim 16, wherein configuring the region in the memory device comprises setting one or more registers in the memory device.

* * * * *